United States Patent Office 2,908,552
Patented Oct. 13, 1959

2,908,552

MANUFACTURE OF PEROXYHYDRATES AND SUPEROXIDES OF THE ALKALI METAL PEROXIDES

George L. Cunningham, Cleveland Heights, Ohio, and Floyd E. Romesberg, Midland, Mich., assignors to University of Cincinnati Research Foundation, an educational corporation of Ohio No Drawing. Application June 18, 1956
Serial No. 591,814

9 Claims. (Cl. 23—184)

This invention relates to the production of anhydrous alkali metal peroxyhydrates. More specifically, it provides a process for manufacturing anhydrous peroxyhydrates of the alkali metals, particularly the peroxyhydrates of sodium and potassium of high purity and with good economy.

Peroxyhydrates are formed when $H_2O_2$ enters the crystal lattice of many salts as $H_2O_2$ of crystallization, usually by the treatment of the salt with an aqueous solution of hydrogen peroxide, preferably with relatively high concentrations of peroxide and relatively low concentrations of water in the system. Among those which are well known are: $(NH_4)_2SO_4 \cdot H_2O_2$; $K_2CO_3 \cdot 2H_2O_2$; $Na_2HPO_4 \cdot H_2O_2$ and a peroxyhydrate of urea,

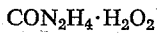

as well as the diperoxyhydrates of calcium, strontium and sodium peroxides.

Some peroxides, particularly those of the alkali metals and the alkaline earth metals, form peroxyhydrates by the action of hydrogen peroxide on the peroxide in question. In general, the use of hydrogen peroxide is expensive and undesirable because when aqueous solutions are used, hydrates may be formed as well as mixtures of hydrates and peroxyhydrates. D'Ans and Friederich describe a number of specific batch methods involving the use of hydrogen peroxide contained in a variety of non-aqueous organic materials (Z. Anorg. Chem., volume 73, pages 325–59, 1911), principally alcohols, ethers, and sodium salts of same.

It will thus be seen that the peroxides are a logical starting material for the preparation of peroxyhydrates of the metal peroxides. Among the prior art processes of particular interest for the formation of alkali metal peroxides is that in U.S. Patent 2,083,691 which specifically describes a process for producing sodium peroxide by oxidizing hydrazobenzene in the presence of sodium methylate. The patented process is made cyclic by reducing the azobenzene formed in the oxidation reaction by means of a sodium amalgam to produce not only the hydrazobenzene desired for a repetition of the oxidation step but also the sodium alcoholate consumed in the same reaction.

It has now been discovered that by suitably modifying the process described in Patent 2,083,691, in a manner about to be described, peroxyhydrates of the alkali metal peroxides may be produced instead of alkali metal peroxides themselves.

The first embodiment of the process described in the patent comprises: first, oxidation of a hydrazo compound; second, separation of the anhydrous alkali metal peroxide; and third, reduction of the azo compound in the benzene-alcohol mixture, to regenerate the hydrazo compound which is returned to the oxidation. An amalgam is used for the reduction and any suitable oxygen containing gas is used for the oxidation. In accordance with the present invention, the sequence of steps disclosed in the patent is generally followed, that is, the present process involves oxidation and reduction of hydrazo and azo compounds, but a significant departure from the teachings of the earlier patent has been found to lead to the production of the peroxyhydrates of the alkali metals instead of the peroxides. More specifically, it has been found that the oxidation reaction should be effected in the presence of controlled amounts of the alcoholate whereby the reaction exemplified in the patent becomes one for producing a peroxyhydrate of the peroxide instead of the peroxides.

The two reactions may be exemplified as:

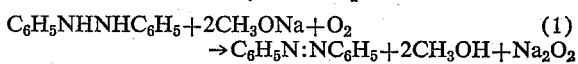

and

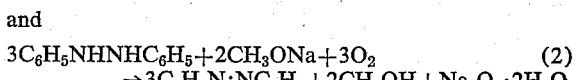

It is immediately apparent, from a consideration of the two exemplary equations, that the second reaction involves the use of relatively only one-third as much alkali metal alcoholate as the first reaction. Since the reduction reaction produces two mols of alcoholate for each mol of azobenzene reduced to hydrazobenzene, the principal change which must be effected in the prior are process is the removal of any desired fraction of the alcoholate, up to the removal of the entire alcoholate content of the mixture, prior to producing the peroxyhydrates by an oxidation of the reduced materials. In some instances, it may be more desirable to remove all of the alcoholate from the reduced solution and then to add the amount necessary to produce the desired peroxyhydrate product, instead of removing just a portion of the alcoholate. Whichever approach is chosen, a number of methods have been developed for removing any desired fraction of the alcoholate.

For convenience in the discussion which follows, the specific reactants disclosed in United States Patent 2,083,691 will be used, that is, the system will include azobenzene, hydrazobenzene, methyl alcohol, sodium alcoholate, sodium peroxide, sodium peroxide diperoxyhydrate, and oxygen. It will be understood by those skilled in the art that instead of hydrazobenzene and azobenzene, the equivalents described in any of United States Patents 2,083,691; 2,059,569 and 2,215,856 may be used and that instead of methyl alcohol, other alcohols particularly those with fewer than 4 carbon atoms may be used, although for reasons of economy, methyl alcohol is preferred. Furthermore, the sodium salts are merely illustrative of the salts of the alkali metals. To prepare the alkali metal peroxide peroxyhydrates by means of reactions similar to those disclosed in the Cunningham Patent 2,083,691, it is first necessary to remove a portion of the sodium methylate from the reduction solution.

Probably the simplest method found for removing all or any desired fraction of the alcoholate in the hydrazobenzene solution, following the reduction reaction, involves the direct addition of anhydrous calcium chloride or of a methyl alcohol solution of calcium chloride to the solution containing hydrazobenzene produced by the reduction reaction. A calcium alcoholate, such as calcium methylate, forms and since the calcium alcoholate is virtually insoluble in the benzene-methyl alcohol solution, it is precipitated therefrom in the form of very fine crystals. The calcium alcoholate may be separated by filtration but because of the extremely fine particle size, filtration has been found to be quite difficult. With the reagents given by way of example in the above mentioned patent, the alcoholate to be removed will be sodium methylate and the precipitate will be calcium methylate. The filter cake of calcium methylate contains a considerable amount of sodium chloride which is also insoluble in the organic liquids present. The mixture of solids adsorbs hydrazobenzene and this constitutes a further disadvantage in the use of this method for removing sodium methylate from the reduced solution. However, it was found that a product consisting of almost pure calcium methylate was produced by properly washing the filter cake with benzene or some other suitable solvent for hydrazobenzene, drying to remove the solvent and then extracting the sodium chloride with liquid ammonia.

A second method was discovered which was found to be particularly useful in instances where it is desirable to remove all of the alkali metal alcoholate. This method involved the addition of large amounts of distilled water to the reduced mixture whereby a two-phase system formed in which methyl alcohol and sodium methylate were present in the water phase and hydrazobenzene was present in the benzene phase. After the two phases were separated, the hydrazobenzene-benzene solution was washed with a small amount of water and dried with calcium chloride, calcium sulfate or any other suitable drying agent. Thereafter, any desired amount of sodium methylate may be added to the hydrazobenzene to form a suitable anhydrous mixture for the subsequent oxidation step. Instead of removing all of the sodium methylate from all of the reduced mixture, any desired fraction of the alcoholate may be removed by the following technique. Only a fraction of the entire reduction mixture is extracted with water as above described to convert this fraction into two phases. The two phases are then separated and the hydrazobenzene-benzene phase, now alcoholate-free, is dried and then added to the proper amount of the unprocessed remainder of the reduction mixture.

A third method was discovered when sodium amalgam and alcohol were used to reduce azobenzene in the alcohol and benzene. It was found that two liquid layers formed after the alkali content reached a certain value depending on the temperature of the system. The separation was more pronounced at lower temperatures. During the reduction the heat evolved was found to promote the reaction. Boiling of the mixture is avoided by suitable cooling and it is preferred to maintain the solution at about 60° C., just below the boiling point, during the reduction. The two phases formed were separated while the solution was hot. One liquid layer contained the greater portion of the hydrazobenzene, dissolved mainly in benzene while the other layer contained almost all of the sodium methylate dissolved in a solution of about equal volumes of methanol and benzene. By controlling the degree of cooling, the relative proportions of the two phases may be controlled to produce, necessary for the production of the diperoxyhydrate in the benzene layer, an amount of sodium methylate by Reaction 2 above.

Still another method found for removing the undesired excess of alcoholate from the reduced solution involved fractionation in a conventional column. With benzene in the reduction solution, benzene and methanol boil over as an azeotropic mixture consisting of about 60% benzene. However, by substituting toluene for benzene in the reduction solution it was found that fractionation could be effected with the removal of mainly methyl alcohol at first and finally pure toluene. After all of the alcohol was removed and before any substantial amount of toluene is lost, the partially cooled mixture of a solution of hydrazobenzene in toluene and sodium methylate was filtered and the precipitate washed with toluene. The filtrate consisted of hydrazobenzene in toluene while the precipitate was over 98% sodium methylate. With an appropriate amount of the sodium methylate added to the filtrate, preferably as freshly reduced solution, the resulting composition was suitable for oxidation to produce sodium peroxide diperoxyhydrate.

Still another method which has been found for removing the sodium methylate is to pass carbon dioxide into the benzene-alcohol solution whereby sodium methyl carbonate is formed and then separated from the solution. In a further alternative, the alkali metal methylate may be neutralized by the addition of any suitable acid for example gaseous dry HCl, precipitating NaCl and effectively removing alkali from the system in this manner.

The following examples will further illustrate the nature of this invention but the invention is not to be construed as limited in any way by these examples.

Example 1

A solution was prepared by dissolving 80 grams of azobenzene in 600 cc. of benzene and 400 cc. of methanol. The solution was then reduced with a sodium amalgam initially containing about 0.2% sodium (by weight). About one hour was required to completely react the twenty grams of sodium in the amalgam. The azobenzene solution which was originally a deep red becomes straw yellow in color as the reduction to hydrazobenzene is completed. The resulting hydrazobenzene solution is then separated from the spent amalgam which is returned to a commercial sodium cell for replenishment of the sodium content. Since the hydrazobenzene solution contained about three times as much sodium methylate as was required for the purpose of this invention, 13 grams of anhydrous calcium chloride were added slowly with stirring. Sodium chloride and gelatinous calcium methylate precipitated within about fifteen minutes. The precipitate was separated from the remaining solution by decantation and filtration and was washed with a mixture of methanol and benzene. The washings were added to the filtrate containing hydrazobenzene and a diminished amount of sodium methylate. The solution was oxidized by passing oxygen into the solution while in an ice bath. The precipitate was washed with a cold mixture consisting of 60% benzene and 40% methanol, and identified as $Na_2O_2 \cdot 2H_2O_2$. About 60% of the sodium methylate was converted to the diperoxyhydrate of sodium peroxide during the oxidation step. The filtrate consisting largely of azobenzene in benzene and methanol was returned to the process for reduction with sodium amalgam in a repetition of the process.

Example 2

Example 1 was repeated except that the oxidation step was carried out at about 25° C. instead of 0° C. The results were substantially the same.

Example 3

The process of Examples 1 and 2 was repeated except that about ⅔ of the sodium methylate was removed by precipitation of calcium methylate and sodium chloride through the addition of anhydrous calcium chloride to the reduced solution. It was found that about 90% of the sodium methylate remaining after the treatment with calcium chloride was converted to the diperoxyhydrate of sodium peroxide.

Example 4

A solution was prepared from 64 grams of azobenzene, 480 cc. of thiophene-free benzene and 320 cc. of methanol. The solution was reduced in the same manner as that in Example 1, i.e. by action of a dilute sodium amalgam (0.1% by weight). Anhydrous calcium chloride (96%) was added to remove half of the methylate. The solution was stirred for 1 hour, filtered and washed. The filtrate was then oxidized while maintained at about 0° C. in an ice bath. The precipitate was separated from the solution by filtration and washed white with a mixture of benzene (60%) and methyl alcohol (40%) at about 0° C. The product was identified as $Na_2O_2 \cdot 2H_2O_2$ and was an excellent source of peroxide oxygen for chemical reactions.

Example 5

The reduction was carried out in the same manner as Example 1, except that 1120 cc. of reduced solution were produced from 88 grams of azobenzene, 660 cc. of thiophene-free benzene and 440 cc. of methanol. The solution was reduced with a sodium amalgam as before, and 747 cc. of the mixture resulting from the reduction was then extracted with water. The resulting product separated into two phases. The benzene-hydrazobenzene phase was then dried to remove the water present. After about 70 cc. of water had been removed by drying, a mixture was formed from 70 cc. of benzene, 200 cc. of methanol, the dried benzene-hydrazobenzene mixture, and 373 cc. of the originally reduced solution which constituted the fraction of the reduced solution separated from the 747 cc. which was to be extracted with water and which was retained to provide the desired sodium methylate for the oxidation reaction. Oxidation was carried out by bubbling oxygen gas into the mixture for about two hours at 0° C. after which the solution was filtered and the precipitate washed with a 10% methanol-90% benzene mixture, and finally with benzene. After drying under vacuum for one hour, about 15 grams of a product was obtained which was analyzed and found to be $Na_2O_2 \cdot 1.9H_2O_2$ of about 97.2% purity.

Example 6

A reduced solution was prepared by action of a dilute amalgam on a mixture of 96 grams of azobenzene, 720 cc. of thiophene-free benzene and 480 cc. of methanol. A portion of the resulting solution was retained for analysis and the remainder, amounting to 1080 cc., was extracted with water. 656 cc. of a hydrazobenzene solution in benzene was obtained. To this, about 10 grams of anhydrous $CaCl_2$ was added and the solution was allowed to stand overnight. 124 cc. of potassium methylate ($KOCH_3$) was added to the solution to provide an amount equivalent to one-half of the sodium methylate ($NaOCH_3$) originally present, prior to the water extraction step. 200 cc. of methanol was added to the mixture of dried hydrazobenzene-benzene and potassium methylate and the oxidation of this mixture was carried out at 0° C. for three hours. The solution was filtered and the precipitate was washed as in Example 5. By analysis, the material was identified as $K_2O_2 \cdot 2H_2O_2$.

It was observed that when sodium amalgam and methyl alcohol were used to reduce azobenzene in an alcohol-benzene solution, two liquid layers formed after the alkali content reached a certain value depending to some extent on the temperature of the solution. The separation was more pronounced at lower temperatures. During the reduction the heat evolved raised the temperature of the solution almost to the boiling point and it was necessary to cool the reaction vessel to avoid boiling. With proportions such as were used in the foregoing examples, the amount of sodium methylate was sufficient to produce two separate phases in the hot reduced mixture.

One liquid layer contained the greater portion of the hydrazobenzene dissolved mainly in benzene while the other layer contained almost all of the sodium methylate dissolved in a solution of equal volumes of methanol and benzene.

The following table sets forth two typical experimental runs made:

|     | Denser Phase | | | Less Dense Phase | | |
| --- | --- | --- | --- | --- | --- | --- |
|     | $C_6H_6$ | $CH_3OH$ | $NaOCH_3$ | $C_6H_6$ | $CH_3OH$ | $NaOCH_3$ |
| (A) | 660 cc. |  | 102 Meq. | 1,090 |  | 1,460 Meq. |
| (B) | 940 | 192 | 172 Meq. | 970 | 840 | 1,935 Meq. |

The less dense phase consisted of 62% of the total volume in run A and 60% of the volume in run B and the less dense phase contained 93.5% and 92% of the alkali (as sodium methylate) in the respective runs.

One procedure used to remove sodium methylate to prepare the reduced solutions for oxidation was to separate the two phases that formed after reduction. In this manner the benzene layer contained only about 8% or less of the alkali. To increase the alkali content in the benzene layer, the next step was to add the correct amount of the alcohol layer to the benzene layer. The hydrazobenzene present in the alcohol layer was removed by extraction with benzene and could be either added to the reduced solution awaiting oxidation, or used in a subsequent run.

The experiments of the preceding examples were repeated at both 0° and 25° C. and with no alkali removed, as in Cunningham Patent 2,083,691; with one-half of the alkali (sodium methylate) removed and with two-thirds of the alkali removed. The results may be summarized as follows:

(1) With no alkali removed prior to oxidation, NaOOH was the stable phase at 25° C. and about 45% of the sodium was recovered as NaOOH: at 0° C., with no alkali removed prior to oxidation about 30% of the sodium was recovered as $Na_2O_2 \cdot 2H_2O_2$.

(2) With one-half of the methylate separated from the system prior to oxidation at 0° C. and 25° C., about 60% of the remaining sodium was recovered as the stable solid phase, as $Na_2O_2 \cdot 2H_2O_2$.

(3) With two-thirds of the methylate removed prior to oxidation, the stable phase was again $Na_2O_2 \cdot 2H_2O_2$ and about 90% of the remaining sodium was recovered as $Na_2O_2 \cdot 2H_2O_2$.

The peroxyhydrates of the alkali methal peroxides, prepared as above described, are valuable as sources of peroxide oxygen and as intermediates in the preparation of alkali metal superoxides.

Alkali metal superoxides have been suggested as sources of oxygen in breathing apparatus and as means for providing oxygen in submarines or other restricted atmospheres. Presently practical methods for preparing the superoxides of potassium and sodium involve the use of oxygen at extremely high pressures and at elevated temperatures, as shown for example in U.S. Patent 2,648,596. We have found that both $KO_2$ and $NaO_2$ may be prepared at temperatures at or below room temperature, and at pressures of one atmosphere or less, from the diperoxyhydrates of their peroxides.

Possible representations of the manner in which the conversions are effected are:

$$Na_2O_2 \cdot 2H_2O_2 \rightarrow 2NaO_2 + 2H_2O$$
$$K_2O_2 \cdot 2H_2O_2 \rightarrow K_2O_4 + 2H_2O$$

but it is also probable that the products may include other oxides of sodium or potassium, or their hydroxides.

The reaction for sodium proceeds readily either under the influence of ultraviolet light, and preferably at temperatures below 40° C., or under a vacuum at similar temperatures. With ultraviolet light, 20% conversions to $NaO_2$ are achieved within a few hours, while under vacuum, days and sometimes months have been required for similar yields.

There have previously been described several methods by which sodium methylate and water were removed from the hydrazobenzene solution following the reduction reaction. It was found that the conversion to $NaO_2$ was only about $\frac{1}{15}$ as rapid when $CaCl_2$ was used to effect this removal as when the $Na_2O_2 \cdot 2H_2O_2$ was prepared by the other methods disclosed, not utilizing $CaCl_2$.

In addition to the yellow $NaO_2$ prepared as above described, we have also prepared a yellow product by warming the compound $K_2O_2 \cdot 2H_2O_2$ after it had been produced at about 0° C. The conversion to $KO_2$ was effected by removing the evolved water by means of a vacuum, or in a stream of gas, or by means of liquid ammonia.

Actually it was found that $KO_2$ (or $K_2O_4$) formed rapidly from $K_2O_2 \cdot 2H_2O_2$ by merely allowing the precipitate of the latter to warm after it had formed at 0° C. in the anhydrous benzene and methanol solvent by the oxidation of potassium methylate as described in Example 6. The superoxide was prepared from $K_2O_2 \cdot 2H_2O_2$ by placing the latter in a dessicator and evacuating it to 3 mm. pressure. The resulting product contained 69% $KO_2$.

Samples were prepared from $K_2O_2 \cdot 2H_2O_2$ by irradiating the latter with a sun lamp while gas was drawn through the samples. With ammonia gas, the product contained 69% $KO_2$, with oxygen gas, the $KO_2$ content was only 53%.

$KO_2$ was also prepared by subjecting $K_2O_2 \cdot 2H_2O_2$ in liquid ammonia at −33° C. to the action of ultraviolet light.

The above experiments indicated that the superoxides of potassium and sodium are readily prepared from the corresponding peroxyhydrates of their peroxides, without recourse to extremely high temperatures or pressures.

We claim:

1. A process for producing peroxyhydrates of alkali metal peroxides represented by the formula $M_2O_2 \cdot nH_2O_2$ wherein M is an alkali metal and $n$ is at least 2, which comprises: oxidizing a solution of a hydrazo compound in the presence of an alcoholate of an alkali metal in an anhydrous mixture of benzene and of an alcohol, to form the corresponding azo compound and to precipitate the peroxyhydrate of the alkali metal peroxide, and recovering the peroxyhydrate so produced; wherein the improvement comprises proportioning the amount of alcoholate so that three mols of the hydrazo compound are present for each two mols of alkali metal alcoholate in the solution to be oxidized, whereby for each mol of hydrazo compound whose oxidation is accompanied by the production of one mol of alkali metal peroxide, there are also oxidized two mols of hydrazo compound with consequent formation of two mols of hydrogen peroxide and combination of same with the alkali metal peroxide.

2. A process for producing peroxyhydrates of alkali metal peroxides represented by the formula $M_2O_2 \cdot nH_2O_2$ wherein M is an alkali metal and $n$ is at least 2, which comprises: oxidizing a solution of hydrazobenzene in the presence of an alcoholate of an alkali metal and of an alcohol of the group consisting of methyl alcohol and ethyl alcohol, in an anhydrous mixture of benzene and of said alcohol, to form azobenzene and to precipitate the peroxyhydrate of the alkali metal peroxide and recovering the peroxyhydrate so produced; wherein the improvement comprises proportioning the amount of alcoholate so that about 3 mols of hydrazobenzene are present for each 2 mols of alkali metal alcoholate, whereby for each mol of hydrazo compound whose oxidation is accompanied by the production of one mol of alkali metal peroxide, there are also oxidized two mols of hydrazo compound with consequent formation of two mols of hydrogen peroxide and combination of same with the alkali metal peroxide.

3. A process for producing a diperoxyhydrate of an alkali metal peroxide having the formula $M_2O_2 \cdot 2H_2O_2$ wherein M is an alkali metal of the group consisting of sodium and potassium, which comprises: oxidizing a solution of a hydrazo compound in the presence of an alcoholate of the alkali metal in an anhydrous mixture of benzene and of an alcohol, to form the corresponding azo compound and to precipitate the peroxyhydrate of the alkali metal peroxide and recovering the peroxyhydrate so produced, wherein the improvement comprises proportioning the amount of alcoholate so that at least three mols of the hydrazo compound are present for each two mols of alkali metal alcoholate in the solution to be oxidized, whereby for each mol of hydrazo compound whose oxidation is accompanied by the production of one mol of alkali metal peroxide, there are also oxidized two mols of hydrazo compound with consequent formation of two mols of hydrogen peroxide and combination of same with the alkali metal peroxide.

4. A process for producing $Na_2O_2 \cdot 2H_2O_2$ which comprises: oxidizing a solution of hydrazobenzene in the presence of sodium methylate in an anhydrous mixture of benzene and of methyl alcohol, to form azobenzene and to precipitate the peroxyhydrate of sodium peroxide and recovering the peroxyhydrate so produced; wherein the improvement comprises proportioning the amount of sodium methylate so that about three mols of hydrazobenzene are present for each two mols of sodium methylate in the solution to be oxidized, whereby for each mol of hydrazo compound whose oxidation is accompanied by the production of one mol of alkali metal peroxide, there are also oxidized two mols of hydrazo compound with consequent formation of two mols of hydrogen peroxide and combination of same with the alkali metal peroxide.

5. A process for producing diperoxyhydrates of sodium and potassium peroxides of the formula $$M_2O_2 \cdot 2H_2O_2$$

wherein M is an alkali metal of the group consisting of sodium and potassium, wherein an azo compound dissolved in an anhydrous mixture consisting of benzene and a lower alcohol is reduced by means of an alkali amalgam, to produce a mixture containing the corresponding hydrazo compound and an alcoholate of the alkali metal of said amalgam and a portion of the said alcoholate is removed from the mixture and the remainder of the mixture is oxidized whereby the original azo compound is regenerated and a peroxide is formed; wherein the improvement comprises: removing said alcoholate from the reaction mixture at least to the extent that the molar ratio of alkali metal alcoholate to hydrazo compound in the liquid is diminished to a maximum of 2 mols of alkali metal alcoholate to 3 mols of hydrazo compound whereby the oxidation of the hydrazo compound results in the formation of two mols of hydrogen peroxide for each mol of alkali metal peroxide so that the peroxide compound formed in the oxidation step is a peroxyhydrate of an alkali metal peroxide, and recovering said peroxyhydrate.

6. The process of claim 5 in which the amount of alcoholate is diminished to the desired mol ratio by removal of the excess alcoholate from the mixture by extraction with water.

7. The process of claim 5 in which the amount of alcoholate is diminished to the desired mol ratio by removal of the excess alcoholate from the mixture by precipitation with an alkaline earth halide.

8. The process of claim 5 wherein the alkali metal is sodium, the alcohol is methyl, the azo compound is azobenzene and the recovered product is a peroxyhydrate of sodium peroxide $Na_2O_2 \cdot nH_2O_2$ wherein $n$ is at least 2.

9. The process of claim 5 wherein the recovered diperoxyhydrate of an alkali metal peroxide is converted to the superoxide of said alkali metal.

References Cited in the file of this patent

UNITED STATES PATENTS

| | | |
|---|---|---|
| 2,083,691 | Cunningham | June 15, 1937 |
| 2,215,856 | Pfeiderer | Sept. 24, 1940 |
| 2,648,596 | Schechter | Aug. 11, 1953 |

OTHER REFERENCES

Annalen der Chemie, by Justus Liebig, 1878, Band 193, pp. 241–297.